United States Patent
Engström (10) Patent No.: US 8,689,618 B2
(45) Date of Patent: Apr. 8, 2014

(54) METHOD AND DEVICE FOR DYNAMOMETER TESTING OF A MOTOR VEHICLE

(75) Inventor: Christian Engström, Tyresö (SE)

(73) Assignee: Rototest International AB, Ronninge (SE)

( * ) Notice: Subject to any disclaimer, the term of this patent is extended or adjusted under 35 U.S.C. 154(b) by 223 days.

(21) Appl. No.: 13/159,854

(22) Filed: Jun. 14, 2011

(65) Prior Publication Data

US 2011/0303000 A1    Dec. 15, 2011

Related U.S. Application Data

(60) Provisional application No. 61/354,431, filed on Jun. 14, 2010.

(30) Foreign Application Priority Data

Jun. 14, 2010   (SE) ...................................... 1000637

(51) Int. Cl.
*G01M 17/007*   (2006.01)

(52) U.S. Cl.
USPC ..................................... 73/116.05; 73/114.13

(58) Field of Classification Search
USPC ............... 73/114.13, 114.14, 114.15, 114.25, 73/115.08, 116.05, 116.06, 116.07
See application file for complete search history.

(56) References Cited

U.S. PATENT DOCUMENTS

| 4,669,318 | A | * | 6/1987 | Angstrom | ................... | 73/862.09 |
|---|---|---|---|---|---|---|
| 5,531,107 | A | * | 7/1996 | Ganzhorn, Jr. | .............. | 73/116.06 |
| 8,001,835 | B2 | * | 8/2011 | Engstrom | ................... | 73/116.06 |
| 8,387,449 | B2 | * | 3/2013 | Engstrom et al. | .......... | 73/116.05 |
| 2006/0042365 | A1 | * | 3/2006 | Bond | ........................... | 73/117.3 |
| 2009/0126510 | A1 | * | 5/2009 | Engstrom | ................... | 73/862.14 |
| 2010/0107750 | A1 | * | 5/2010 | Engstrom et al. | .......... | 73/116.05 |

* cited by examiner

*Primary Examiner* — Eric S McCall
(74) *Attorney, Agent, or Firm* — Dickstein Shapiro LLP (57) ABSTRACT

Dynamometer testing of a vehicle comprising, with only a first wheel shaft connected to a dynamometer test unit, including the steps of applying a first power to the first wheel shaft, determining a representation of the first power using the dynamometer test unit, determining a second power, different from the first power, being applied to one or both of the first wheel shaft and the second wheel shaft, the second power being a virtual power represented by a virtual representation of second power, and, based on the representation of the first power determined by the dynamometer test unit and the virtual representation of the second power, determining a first speed which is a representation of the speed of the vehicle driven on a road and subjected to the first and second power.

31 Claims, 4 Drawing Sheets

Fig. 1

PRIOR ART

METHOD AND DEVICE FOR DYNAMOMETER TESTING OF A MOTOR VEHICLE

This application claims the benefit of U.S. Provisional Application Ser. No. 61/354,431, filed Jun. 14, 2010, the disclosure of which is incorporated by reference.

FIELD OF THE INVENTION

This invention relates to dynamometer testing of vehicles, and in particular to a method and a device for dynamometer testing of vehicles.

BACKGROUND OF THE INVENTION

Dynamometer testing of vehicles is known per se, and can, for example, be carried out by roller type dynamometers equipped with large rollers that support the vehicle wheels, and which are used to apply a brake torque to the drive wheels of the vehicle. Such systems, however, are not always capable of providing the desired measurement accuracy and/or measurement freedom.

Another kind of vehicle dynamometers for dynamometer testing of vehicles is disclosed in U.S. Pat. No. 4,669,318 (Ångström). This document relates to an apparatus for dynamometer testing of motor vehicles, where load absorbing means in the form of a hydrostatic pump assembly has an input shaft for engagement with a drive shaft of a vehicle to be tested. Sensor means are arranged so as to allow measuring of the torque from the vehicle drive shaft. Typically, in a vehicle having two wheel drive, each drive shaft is fixedly connected to an individual apparatus of this kind, whereby a total effective torque from the vehicle can be accurately measured.

Systems of the kind disclosed in U.S. Pat No. 4,669,318 are reliable, and are capable of accurately measuring torque in steady load situations.

It is also possible to perform more complex tests using a dynamometer testing system of the above kind, both for two-wheel drive systems, and also for four-wheel drive systems. Such more complex testing, using a system of the above kind, is disclosed in the International patent application WO2007/13154 A1 (Engstroem).

There exist, however, situations where measurement results representing a true vehicle driving situation, taking into account conditions that prevail during real life driving of the vehicle on a road, are requested, but where such measurements are not possible for economical or other reasons.

Aim and Most Important Features of the Invention

It is an object of this invention to provide a method and a device for dynamometer testing of a motor vehicle that overcome the problems of the background art and that provide a method and a device for testing vehicles without actually dynamometer testing all wheel shafts of the vehicle.

According to the present invention, it is provided a method for dynamometer testing of a vehicle. The vehicle comprises at least a first wheel shaft and a second wheel shaft and a first power source for providing power to said first wheel shaft. The method comprises, with only said first wheel shaft being connected to a dynamometer test unit, applying a first power to said first wheel shaft, determining a representation of said first power by means of said dynamometer test unit, determining a second power, being different from said first power, to be applied to at least one of said first wheel shaft and said second wheel shaft, the said second power being a virtual power being represented by a virtual representation of said second power, and by means of the representation of said first power determined by said dynamometer test unit and said virtual representation of said second power, determining a first speed being a representation of the speed of said vehicle when being driven on a road subjected to said first and second power.

The present invention has the advantage that vehicles having means for applying two (or more) separate powers (power contributions) to the same or different wheel shafts, where at least one of said first and second power contributions can be selectively applied, can be tested without actually applying the second power to a wheel shaft.

That is, only said first power has to be a real power being provided by a real power source during testing, while the power source of the second power do not apply the said second power during testing. In fact, when the virtual second power is provided by a second power source being different from said first power source, the second power source need not even be present in the vehicle during testing. The virtual representation of the said second power ensures that measurement results taking the contribution from the said second power into account is still obtained.

According to the invention, a virtual representation of the one (or more) power sources providing said virtual second power is used to determine the contribution from simulated power contributions (e.g. from power source(s) not being connected to a dynamometer test unit) so that driving properties of the vehicle can be accurately determined, still taking into account the contribution from the simulated power contribution. The term "virtual representation" of said second power is, in the following description and claims, used to denote a representation of said second power that is implemented in software. The virtual representation can, for example, consist of a mathematical description of the second power, and/or be created from measurements of a real second power.

According to one embodiment of the invention, the vehicle comprises two (or more) different power sources, where the first power source provides the said first power to the first wheel shaft and where a second power source provides power to the first wheel shaft and/or the second wheel shaft. A virtual representation of the second power source provide said virtual second power, so as to allow that the behavior of the vehicle when driving on a real road is accurately tested even though the second power source is not being connected to a dynamometer test unit and hence need not even be present in the vehicle during testing.

Consequently, the present invention allows accurate testing of a vehicle without actually applying both the first power and the second power. Hence, testing can be accomplished without actually having to use dynamometer test units for all driven shafts of the vehicle, and/or without having all power sources present.

The invention can thus be used to simulate presence of a second power source, and hence behaviour of the vehicle as if the second power source where present, even if the second power source is not actually present in the vehicle.

For example, it is becoming more and more common to use hybrid drives in vehicles, such as, e.g. electric hybrid drives. The present invention can advantageously be used for testing of such systems, wherein, e.g. driven one or more shafts of the hybrid system can be connected to dynamometer test units, while contribution from e.g. a combustion engine can be determined using a model or other suitable kind of representation of the combustion engine, so that the total behaviour of the vehicle in simulated real driving conditions can be obtained.

As is exemplified in the following detailed description of the present invention, there also exist numerous other situations where the present invention can be utilized.

The dynamometer test unit can measure torque and rotational speed on the wheel shaft to which the dynamometer test unit is connected, and by converting this measured rotational speed to a virtual vehicle speed, by means of a tire-road interface such as a slip value, which, e.g., can be obtained from a tire model, the road is simulated and thus act as interconnecting element.

The true vehicle speed can, for example, be determined using the equation:

$$\text{Speed}_{wheel\_x}(1-\text{slip}_{wheel\_x}) = \text{Speed}_{wheel\_y}(1-\text{slip}_{wheel\_y})$$

This equation can be set up for all possible wheel shaft combinations, and by means of these equations a true vehicle speed can be calculated. Using this true vehicle speed and the slip value(s) of the wheel shaft(s), the dynamometer test unit(s) can be set so that correct shaft speeds, i.e. shaft speeds that the shafts would have in real-life driving, are obtained.

The present invention thus provides a method to accurately test e.g. a hybrid drive portion of a vehicle and its influence on the total driving experience when the combustion engine is taken into account without actually performing a simultaneous test of the combustion engine portion of the vehicle, or vice versa.

The invention can be applied for positive as well as negative slip, i.e. also when a negative torque is applied to the tire on the shaft, such as when simulating the driver braking the vehicle so as to reduce its speed. In this case a rotational power is applied to the shaft from an external power source such as the dynamometer test unit.

In one embodiment, the dynamometer test unit(s) includes a hydraulic pump unit which generates a hydraulic fluid flow during operation, and by throttling the hydraulic fluid flow a brake torque, individually adjustable for each drive shaft being connected to a dynamometer test unit, can be applied to the said drive shaft. An individually adjustable fluid valve can be arranged to throttle fluid flow from each pump unit.

According to another embodiment of the present invention, the dynamometer test unit(s), instead, comprise an electric motor so as to provide a propelling force on the drive shaft from the dynamometer test unit.

BRIEF DESCRIPTION OF DRAWINGS

The invention will now be described in greater detail with reference to the drawings, wherein.

DESCRIPTION OF EXEMPLARY EMBODIMENTS

Figure 1:
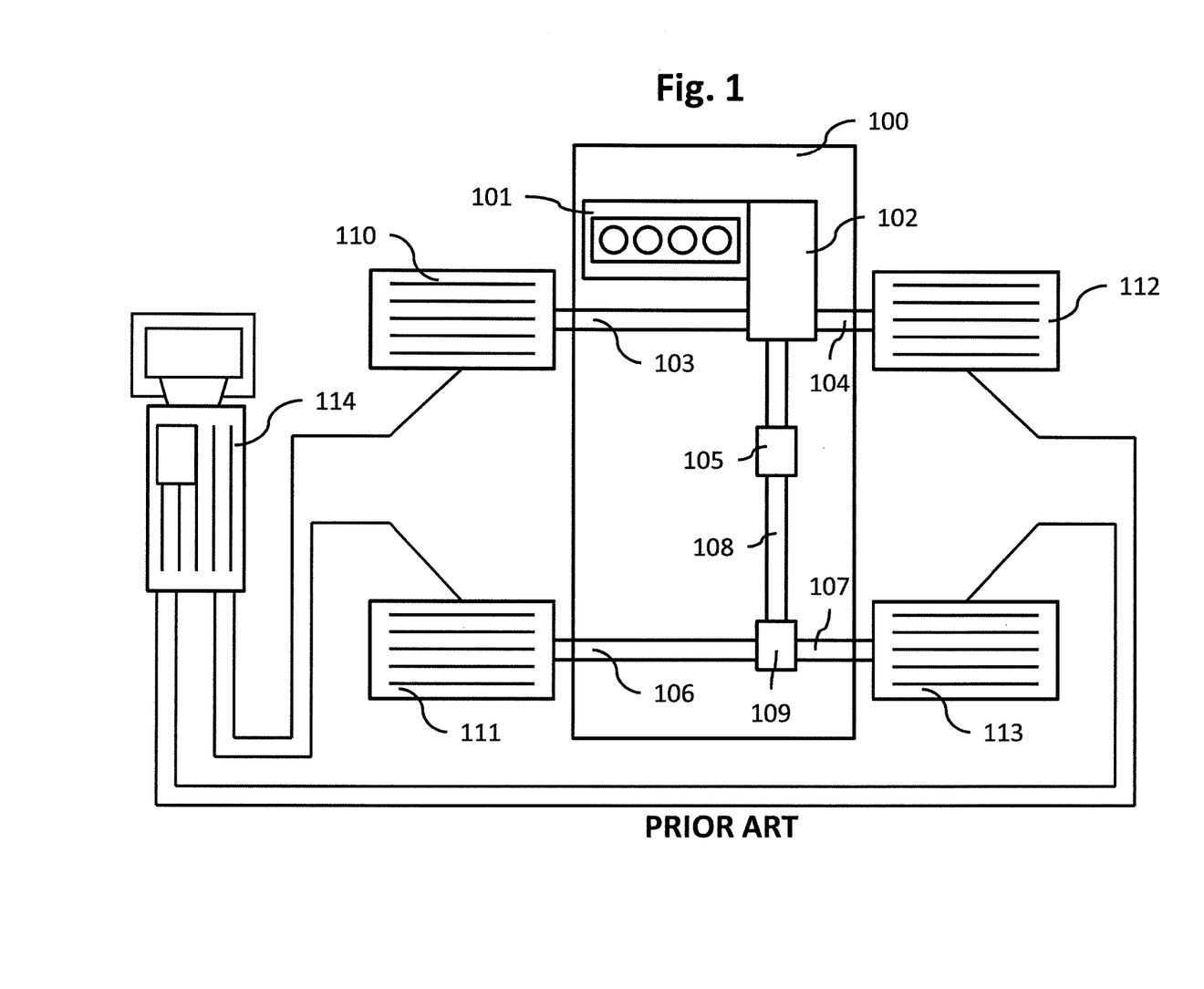
FIG. 1 shows an example of a prior art process of dynamometer testing a vehicle.

FIG. 1 discloses a vehicle 100 in the process of being tested with a vehicle dynamometer testing system according to the prior art.

The disclosed vehicle 100 comprises a drive train, which comprises a combustion engine 101 which, in a conventional manner, is connected to a gearbox 102. The gearbox 102 can be of any suitable kind and, e.g., consist of a manual transmission or an automatic transmission.

The vehicle 100 is a four-wheel drive vehicle, and comprises front axle wheel shafts 103, 104, and rear axle wheel shafts 106, 107. The vehicle further comprises a torque distributor 105 for distributing the torque (power) provided by the combustion engine 101 (via the gear box 102) to the front axle wheel shafts 103, 104 and the rear axle wheel shafts 106, 107 of the vehicle. A propeller shaft 108 connects the torque distributor 105 with the rear axle wheel shafts 106, 107 via a final drive 109. The wheels of the vehicle are not shown due to the vehicle being set up for dynamometer testing.

A vehicle dynamometer testing system is connected to the vehicle 100, and comprises dynamometer test units 110, 111, 112, 113. The dynamometer test units 110-113 are connected to a common measuring and control system 114, such as e.g. a computer with associated display, by means of which the tests are controlled, and by means of which an operator of the system can initiate tests and provide necessary information for performing the dynamometer tests. Torque and rotational speed can be measured in different ways, and the torque can be measured directly or indirectly, e.g. by means of a strain gauge as discussed e.g. in U.S. Pat. No. 4,669,318 or by measuring, e.g., oil pressure in a hydraulic dynamometer test unit or an electric current in a dynamometer test unit comprising an electric motor instead of hydraulic pump.

Figure 2:
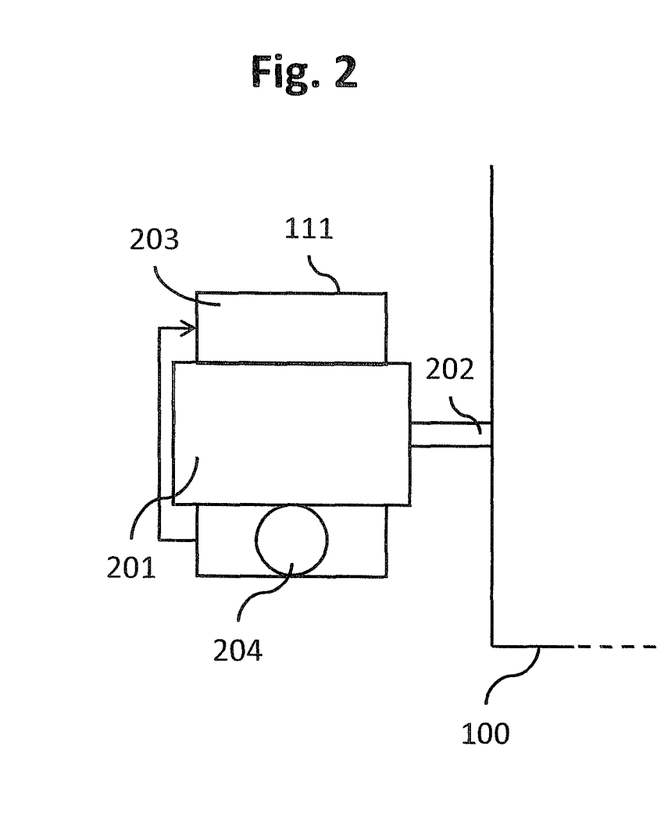
FIG. 2 shows an exemplary dynamometer test unit.

The dynamometer test units 110-113 can consist of substantially identical test units, and, as can be seen more in detail in FIG. 2, which shows an example of a test unit 111, each dynamometer test unit 110-113 can comprise a dynamometer in the form of a power-absorbing hydrostatic pump assembly, consisting of one (or more) hydraulic pump(s) 201, and means for measuring the torque applied to the pump input shaft 202 (this will be explained below), which is arranged to be rigidly connected to a drive shaft of the vehicle 100. The rigid connection can be accomplished, e.g. by removing the vehicle wheel and attaching the pump input shaft 202 of the test unit to the wheel hub, directly or by means of a suitable adapter, so as to obtain a rigid connection between vehicle and dynamometer test unit in a simple manner utilizing the existing wheel fasteners of the vehicle. The rigid connection has the advantage that rotational speed of a wheel shaft can be measured by a suitable sensor measuring rotational speed of the pump input shaft 202.

The pump 201 is connected to a hydraulic oil tank 203, and, in use, the hydraulic pump flow and pressure is controlled, e.g. by means of a control valve 204. The output flow from the pump 201 can be restricted by means of the control valve 204, so that a pressure is built up, which tries to turn the pump around its own axle. This turning motion being restricted by a load cell equipped with a strain gauge (not shown), and the signal from the strain gauge is supplied to the common measuring and control system 114. The disclosed system is, for a two-wheel drive vehicle, explained more in detail in the U.S. Pat. No. 4,669,318.

By calibrating the signal from the strain gauge against a known torque, the signal will be proportional to the torque that the pump input shaft is subjected to by the wheel hub (drive shaft). The control valve 204 can, for example, constitute an ultra fast control valve, such as the kind described in the international patent application WO 2004/111739 A1, by the use of which flows and pressure can be accurately adjusted. A portion of the liquid flow can be diverted to hydraulic motors for driving e.g. a fan arrangement for cooling purposes. This is explained more in detail in WO2007/008133.

By means of the system of FIG. 1, the vehicle 100 can be tested during rapid accelerations, and, further, wheel torque throughout the vehicle motor speed range can be easily measured.

As was mentioned above, it is also possible to perform more complex tests using a dynamometer testing system of the disclosed kind, both for four-wheel drive systems as the one disclosed in FIG. 1, and also for two-wheel drive systems (in which case dynamometer test units are only connected to the two driven wheel shafts). Such more complex testing, using a system of the above kind, is disclosed in the International patent application WO2007/13154 A1 (Engstroem).

WO2007/13154 A1 essentially describes use of wheel slip values and tire models in vehicle dynamometer testing systems of the disclosed kind. The use of wheel slip values in dynamometer testing systems has the advantage that various real driving conditions and situations can be accurately simulated in order to thoroughly test the vehicle.

The concept of utilizing individual hydraulic dynamometer test units performing the braking action on the drive shafts, in particular in combination with the use of slip values/ tire models, has the advantage that the system can be used to balance torques between front and rear drive shafts of a vehicle with four-wheel drive, which thus allows for accurate testing of vehicles such as the vehicle 100 of FIG. 1 using relevant torque distributions between the various drive shafts, thereby reducing the risk of damaging the drive train of the vehicle being tested by improper loading of the wheel shafts. This is discussed more in detail in WO2007/13154 A1.

Consequently, such four-wheel measurements provide a powerful tool for testing four-wheel drive vehicles in a relatively simple manner.

As was mentioned above, however, there exist situations where measurement results representing a true vehicle driving situation, taking into account dynamic conditions that prevail during real life driving of the vehicle on a road, are requested, but where such measurements are not possible for economical or other reasons.

According to the present invention, it is provided a system that allows testing for at least some of these situations. For example there exist situations where four-wheel measurements are required, but where four-wheel measurements are not available. The present invention provides a solution that produces a result that, at least for some four-wheel drive systems, and also for other four-wheel measurements, corresponds to or even equals the result of a four-wheel measurement system, however without use of dynamometer test units on all shafts of the vehicle being driven by a power source.

Other situations where the present invention is applicable are situations where test results representing real life driving of vehicles being powered by two or more power sources, such as e.g. electric hybrid drive vehicles, are requested, but where all power sources are not actually present in the vehicle during testing.

In particular, the present invention is advantageous for testing of vehicles where power can selectively be applied from two (or more) separate power sources to the same or different wheel shafts of the vehicle, or where power originating from a single power source can selectively be provided to different wheel shafts of the vehicle.

With regard to four-wheel testing, although four-wheel testing using an individual dynamometer test unit for each wheel shaft is appropriate to use with vehicles having a four-wheel drive systems of the above kind, it has been realized according to the present invention that a system utilizing fewer dynamometer test units can provide desired results, in various situations where results from four-wheel measurements are required, but for one or more reasons is not available.

In one exemplary embodiment, which will be exemplified in the following, different power sources provide power to different drive shafts of the vehicle, where it is desired to determine the effect of the total power contribution of the power sources on the driving properties of the vehicle, still performing measurements of shaft(s) being powered by only one of the power sources.

For example, it is becoming more and more common to use hybrid drives in vehicles, such as, e.g. electric hybrid drives.

There exist various kinds of electric hybrid drives. For example, there exist parallel hybrid vehicles in which a combustion engine and an electric motor simultaneously and/or sequentially can provide power to the input shaft of a gear box and thus simultaneously transfer a power to the same vehicle drive wheels from two separate power sources. Series hybrid drives constitute another example in which a combustion engine is used for powering a generator, which, in turn, charges an energy storage which is used for powering an electric motor connected to the drive wheels. Consequently, in this solution, both the electric motor and the combustion engine act on the same (two) drive wheels. As will be explained further below, the present invention is applicable for testing such vehicles when one of the power sources is not present in the vehicle.

There are also other kinds of hybrid drives. For example, a combustion engine or electric motor can be arranged to provide power to drive shafts of e.g. the front wheel shafts of the vehicle (i.e. similar to a conventional front-wheel drive or rear-wheel drive vehicle), but wherein one or more (further) electric motors are used to apply propelling power and/or power for regenerative braking of the rear wheel shaft(s) of the vehicle.

Figure 3:
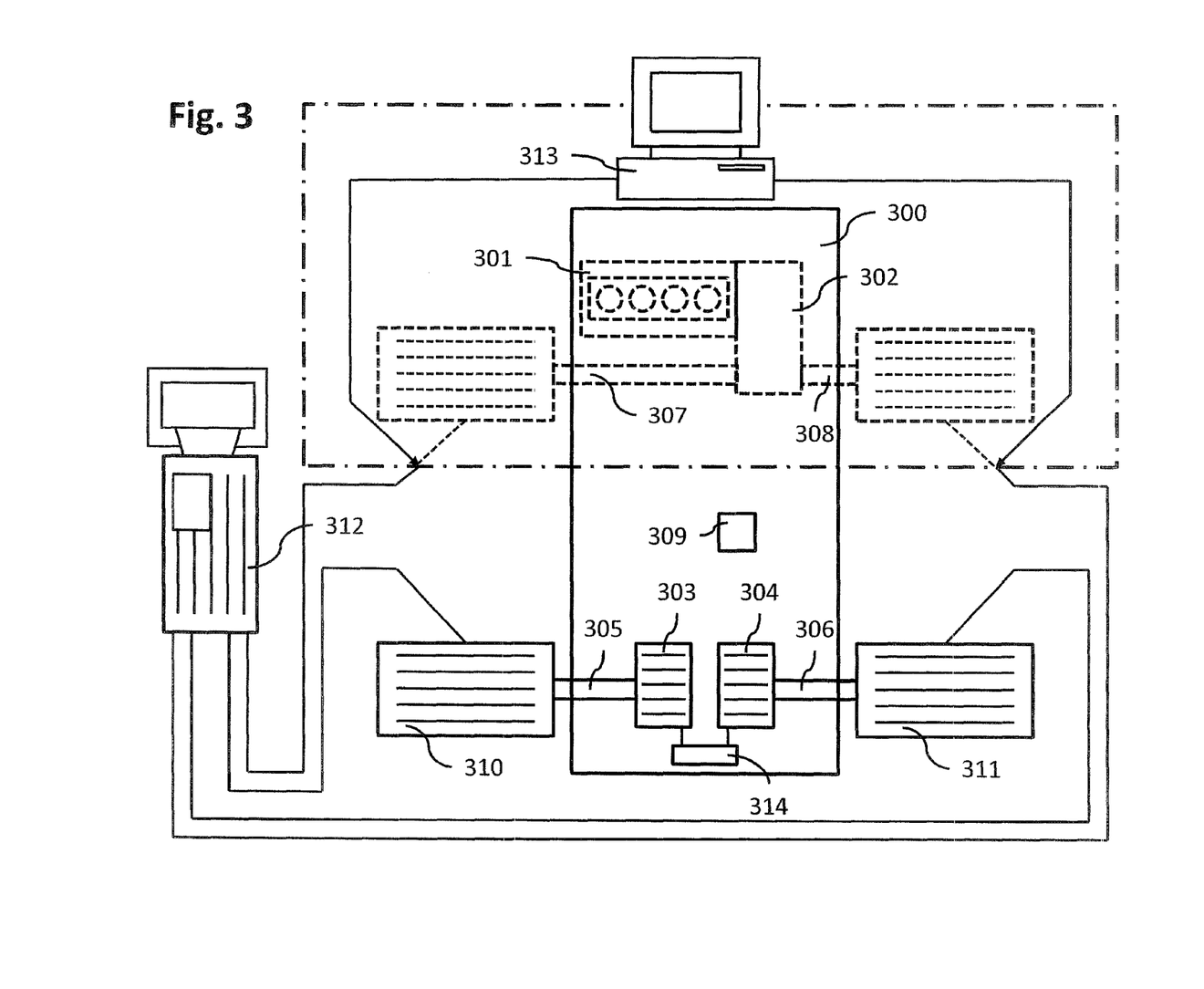
FIG. 3 shows an exemplary dynamometer test process according to the present invention.
Figure 4:
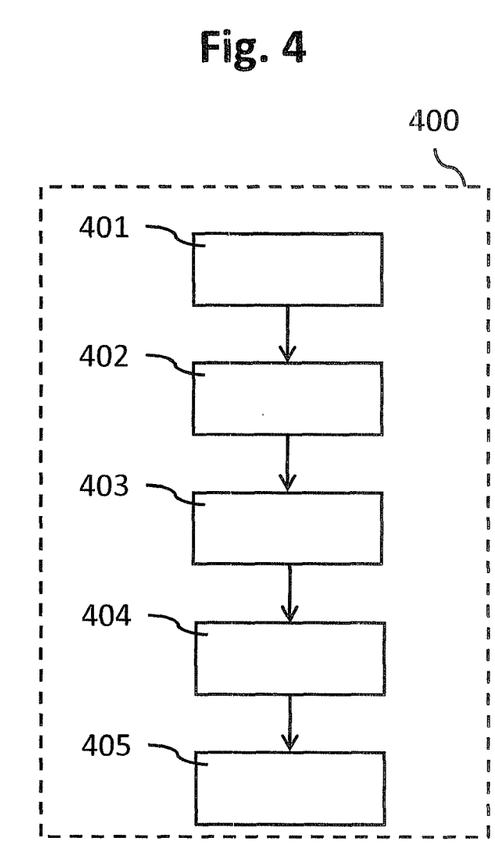
FIG. 4 shows an example of a dynamometer test method according to the present invention.
Figure 5:
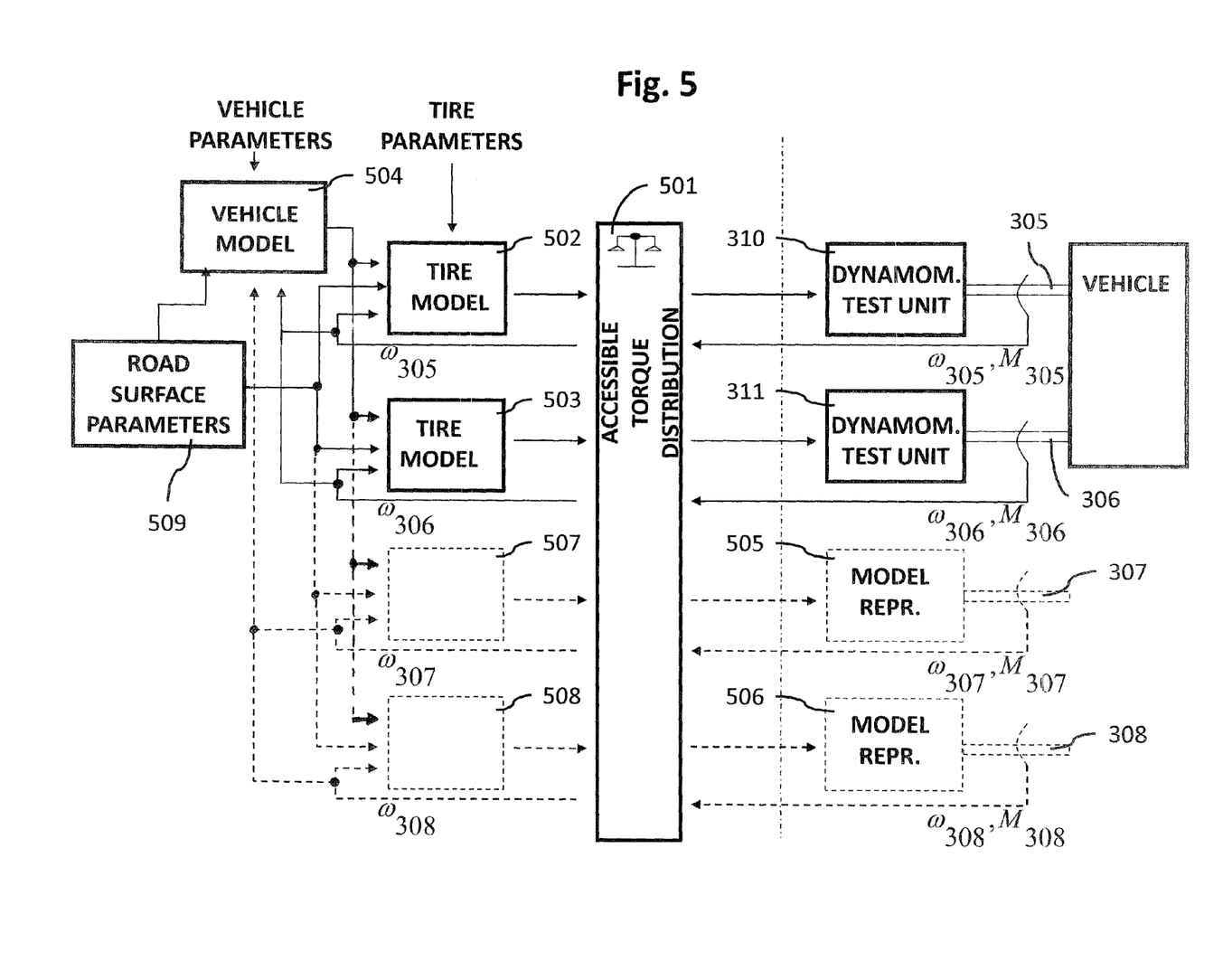
FIG. 5 shows a block diagram of a system employing the present invention.

The present invention will first be exemplified for such vehicles, with reference to FIGS. 3-5. FIG. 3 discloses an exemplary embodiment of the present invention, wherein a vehicle comprising a combustion engine and a hybrid drive in a manner such that drive shafts are being independently driven by separate power sources, and wherein only two dynamometer test units are used.

Similar to FIG. 1, the vehicle 300 in FIG. 3, comprises a combustion engine 301 which, in a conventional manner, is connected to a gearbox 302. Wheel (drive) shafts 307, 308 extend from the gear box to the front axle wheels of the vehicle 300. To this point, the vehicle 300 is similar to a conventional front-wheel drive vehicle. The vehicle 300, however, further comprises electric motors 303, 304, which are directly connected to wheel (drive) shafts of the wheels 305, 306 of the rear axle of the vehicle. Consequently, the combustion engine 301 can provide drive power to the front wheel shafts 307, 308 independent of the electric motors 303, 304. The electric motors 303, 304, in turn, are capable of providing drive power to the rear axle wheel shafts 305, 306 independent of the combustion engine 301. Naturally, the combustion engine and the electric motors 303, 304, respectively, do not operate "on their own", but operation is controlled by means of e.g., a control unit 309 constituting (at least) part of the vehicle control system.

According to vehicles of the kind disclosed in FIG. 3, consequently, the powering of the wheel shafts of the vehicle is coming from two "independent" power sources. Even though the combustion engine 301 and the electric motors 303, 304 are, in general, controlled by the vehicle internal control system (e.g. control unit 309), the work of one of the power sources is not dependent on the work of the other in the same direct manner as, e.g., is the case with the parallel hybrid systems where the shafts of the combustion engine and the electric motors are interconnected.

Obviously, though, with regard to hybrid vehicles of this kind, control of one power source in relation to the other is based on the actual conditions when driving the vehicle 300, and the combustion engine and the electric motor(s) will, during driving, be interconnected by means of the road, since the wheels must rotate with essentially the same speed in order to obtain a tractive force from both systems, if the relative speed difference is too large, wheels of one of the systems will spin or skid.

For example, if the electric motors are providing power to the wheel shafts of the rear axle of the vehicle as in FIG. 3, an increase or decrease in the torque applied by the electric motors will be "sensed" by the combustion engine by means of changes in the rotational speed of the front wheels on the front axle due to changes of the vehicle speed, the road thus becoming an interconnecting element between the separate drive systems.

With regard to dynamometer testing of such systems, tire models (tire models are further explained below) can be used to simulate the road, and thus act as interconnecting element if dynamometer test units are used for all drive shafts.

According to the present invention, it is possible to perform measurements on, e.g., the front shafts or rear shafts of the vehicle only, but where the measurements take torque contributions from the other shaft of the vehicle into account, even though dynamometer test units are used on only two drive shafts, and thereby no interconnecting element between the drive shafts is present.

FIG. 3, therefore, discloses dynamometer test units 310, 311, which, respectively, are rigidly connected (e.g. to the wheel hubs by means of suitable adapters or direct coupling) to the rear axle wheel shafts 305, 306. In one exemplary embodiment, the dynamometer test units 310, 311 are of a kind similar to the dynamometer test units disclosed in FIG. 2.

The dynamometer test units, which e.g. can be standing freely on a floor, are thus connected to the vehicle only by means of a (rigid) coupling to the wheel shafts (wheel hubs) (and possibly some kind of electronic wire connection for communication with the vehicle control system), and hence preferably also "carry" the weight of the vehicle in place of the wheel that has been taken off (it is also contemplated that e.g. some kind of support can be used to at least partly carry the weight of the vehicle).

Consequently, dynamometer test units are used for driven shafts (305, 306) of one kind of power source only (303, 304). A control unit 312 serves for controlling the dynamometer test units 310, 311 and to provide simulation schemes for simulating driving of the vehicle in different drive modes.

A method for dynamometer testing according to the present invention will be explained more in detail with reference to FIGS. 4 and 5. A method 400 according to the present invention starts in step 401.

In order to obtain a proper knowledge of the way in which the hybrid system will behave in actual use of the vehicle, i.e. the manner in which the hybrid system will interact with the combustion engine system, the combustion engine is represented by a model of its behaviour, indicated by a computer 313. Consequently, a virtual representation of the combustion engine 301 is used during dynamometer testing, where data from this virtual representation is provided to the control unit 312. The computer 313 can alternatively be an integrated part of the control unit 312.

The virtual representation represents the behaviour of the combustion engine 301, and, e.g. consists of a model of the behaviour of the combustion engine when using the combustion engine only for propelling the vehicle. The virtual representation can, e.g., consist of a mathematical model, or a tabular representation of one or more engine parameters when a given torque is present on the drive shafts. For example, the representation can be a representation of the engine as seen from the drive shafts 307, 308 on which the combustion engine is working. The virtual representation of the combustion engine is indicated in FIG. 5 as separate representation for the wheel shafts 307, 308 (this is explained further below). The representation can be a single representation representing all wheel shafts being influenced by the virtual power source, in which case the representation define which shafts that are influenced.

The representation of the combustion engine can also be stored e.g. in a suitable memory of the control computer 313. The "non-use" of the combustion engine and associated dynamometer test units during actual testing of the vehicle in FIG. 3 is indicated by these portions being dashed in FIG. 3.

The systems (hybrid drive and virtual representation of the combustion engine) are, according to the present invention, interconnected by means of a "virtual" connection.

This virtual connection is accomplished by the use of a virtual road as an interconnecting element. A virtual vehicle speed can be calculated e.g. by means of a tire-road interface such as a slip value, which, e.g., can be obtained from a tire model.

Basically, when a vehicle is driven on a road, it is the interaction between the individual wheels (tires) and the surface (road) upon which the vehicle is travelling that will determine how torque is distributed between the wheels (tires), and between each of the wheels and the road. The performance of the vehicle is thus entirely dependent on the tire-road interface.

Because of the characteristics of a tire, if a tractive force that accelerates or retards the vehicle is to arise, the peripheral speed of the tire is different (higher when accelerating the vehicle, lower when decelerating the vehicle) from the relative speed of the vehicle in relation to the surface (the road) on which the vehicle is travelling when a torque is applied to the wheel. That is, there can be no substantial tractive force without this relative speed difference.

This difference is represented by a slip value, which is defined as the relative speed difference between the tire and the underlying surface. As an example, the rotational speed for a tire on a drive shaft can be 1-2% higher than the rotational speed of wheels of a non-driving shaft, even when driving at constant speed. This means that if (steady state) driving at 100 km/h, the actual speed of the drive shafts, when compensated by a slip value, corresponds to a rotational speed of the wheels that would result in e.g. 101-102 km/h.

The slip value is dependent on several different parameters, such as type of tire, road paving, weather conditions, applied torque to the drive shaft, acceleration or deceleration of the vehicle, inclination (e.g. driving uphill or downhill), tire wear and normal force acting on the individual shaft carrying the tire in question.

Consequently, by means of the slip value, it is possible to calculate e.g. the manner in which torque produced by power sources will be proportioned between powered wheel shafts of a vehicle in real-life driving.

With regard to FIG. 3, driving on a substrate such as a road is simulated by applying a power (torque) on at least one of the tested wheel shafts 305, 306 of the hybrid axle, step 402 by means of a power source, in this case one or both electric motors 303, 304.

This applied power is then determined by the dynamometer test units in a conventional manner, i.e. according to conventional dynamometer testing as described in documents mentioned above. The speed of the wheel shaft resulting from the power that is applied to the drive shaft is also measured and provided to a load balancing unit 501 (see FIG. 5) for further processing, step 403.

This is illustrated in FIG. 5 where the dynamometer test units 310, 311 connected to the wheel shafts 305, 306 are shown, and where values $\omega_{305}, M_{305}; \omega_{306}, M_{306}$ measured by the dynamometer test units 310, 311 are provided to the load balancing unit 501 in the control unit 312 of FIG. 3 (objects to the left of the vertical line in FIG. 5, and objects indicated by dashed lines to the right, are implemented as software in the control unit 312).

Apart from providing "real" data from the dynamometer test units 310, 311, the load balancing unit 501 is also provided with data from the virtual representation of the combustion engine 301, step 404. The virtual representation of the combustion engine 301 is indicated by model representations 505, 506 of the drive shafts 307, 308, and data corresponding to the data measured by the dynamometer test units 310, 311 is provided to the load balancing unit, i.e. $\omega_{307}, M_{307}; \omega_{308}, M_{308}$.

The load balancing unit 501 calculates a corresponding vehicle speed from obtained data by compensating real and virtual shaft speeds with a slip value. According to the disclosed example, slip values are obtained by tire models 502, 503, one for each tire (wheel shaft) being connected to a dynamometer test unit, and also from tire models 507, 508 of the virtually represented wheel shafts 307, 308.

The slip value can be determined from, e.g., calculations or other representation such as tables representing a model representing the tire-road interface, such as e.g. a theoretical "model tire". Preferably, though, the traction force for each wheel is calculated from a mathematical model of the actual tire(s) being used on the vehicle. Such tire models describe slip values for different driving parameters, and are well known in the art and will therefore be only briefly discussed herein. Oftentimes the tire manufacturer provides tire models of the tires being manufactured.

Tire models can be of different complexity, and e.g. include only longitudinal motion. Alternatively, e.g. turning, and/or lateral motion can be taken into account as well, all being described in the art.

The complexity of the tire model also varies with kind of driving that is to be simulated, i.e. if steady-state driving is to be simulated, or if dynamic behaviors are to be simulated, the latter resulting in more a complex model.

Examples of tire model variables include: rolling radius, wheel-tire inertia, torque applied by the wheel shaft to the wheel, wheel angular velocity, wheel slip, vertical load on tire. Again, reference is being made to known tire modeling.

Consequently, specific vehicle parameters (e.g. with regard to torque applied by the wheel shaft, vertical load) have impact on resulting wheel slip. Therefore, a vehicle model 504 is used to provide vehicle specific data to taken into account, and as mentioned tire model(s) can, e.g., be obtained from tire manufacturers, which allows testing of vehicles for different kinds of tires. Alternatively a mathematical model of theoretical "test tire", can be used which e.g. can consist of a model of a generic tire of some kind.

The vehicle model 504 forms part of load balancing, and input parameters to the vehicle model comprise, e.g.: inclination (i.e. the inclination of the road upon which the vehicle is being simulated), the weight of the vehicle, aerodynamic component, rolling resistance of the wheels. Apart from inclination, other road surface parameters 509 can also be taken into account, such as e.g. friction for representing, e.g. dry pavement, snow, ice etc.

These parameters will result in a driving resistance that will counteract (except, perhaps, in some downhill driving simulations) an accelerating force provided by one or more power sources of the vehicle.

The tire models allow distribution of accessible torque from the vehicle between the shafts of the vehicle, so that the vehicle dynamometer system can be used for measurements with a maintained accurate torque distribution between the wheels (shafts).

For example, it is possible to balance torques on right and left drive shafts, and also to simulate situations where driving parameters differ between the left drive shaft and the right drive shaft as for example simulating the effect of driving with differently worn tires, different friction on left and right side, different normal force (the normal force is, in general, taken into account in the tire models) acting on the different shafts (e.g. to simulate different vehicle load distributions), etc.

As shown, one tire model is used for each wheel of the vehicle. The tire model will then provide a relative slip of the respective wheel, that is, for given input parameters to the tire model, e.g. input parameters as exemplified above, and in particular torque applied by the wheel shaft to the wheel, a slip value will be returned which is a relative slip to the surface on which the wheel is travelling. This slip does not provide the actual speed of the vehicle (wheel shaft), but only a relative slip of the wheel. That is, the slip in percentage will be the same irrespective of the actual speed of the vehicle. A certain applied power gives rise to a certain slip, and in general, depending on the speed of the vehicle, the power will be different since the same torque will require more and more power as speed increases.

Given the slip values obtained for all driven wheels (wheels subjected to a power, be it accelerating or decelerating) a true vehicle speed can be calculated by means of the load balancing unit 501, step 405, where the true vehicle speed is the speed at which the vehicle would be travelling on a real road given the simulated conditions.

This true vehicle speed can, for example, be determined using the following equation:

$$\text{Speed}_{wheel\_x}(1-\text{slip}_{wheel\_x}) = \text{Speed}_{wheel\_y}(1-\text{slip}_{wheel\_y}) \qquad \text{eq. (1)}$$

This equation can be set up for all possible wheel shaft combinations (e.g. wheel_x=wheel of shaft 305, wheel_y=wheel of shaft 306; x=305, y=307; x=305, y=308; x=306, y=307 etc.), and by means of these equations a true vehicle speed can be calculated. Using this true vehicle speed and the slip values of the wheel shafts, the dynamometer test units 310, 311 can be set so that the correct shaft speeds, i.e. shaft speeds that the shafts would have in real-life driving, are obtained.

Consequently, the resulting rotational speed and load of a wheel shaft can be set to correspond to the rotational speed and load that the wheel shaft would have if the vehicle were being driven on a road of the simulated kind using the tires being modeled, where the contribution not only from the electric motors 303, 304 is taken into account, but where the contribution from the combustion engine 301 is also taken into account.

The torque on the shafts 305, 306 of the hybrid system can be constantly (preferably one or many times a second, e.g. 5 times/s, 10 times/s, 100 times/s etc.) measured, and by feeding this measured data to into the load balancing unit, a true vehicle speed and the load that the respective shafts would be subjected to during real life driving can be calculated. This calculated load is provided to the dynamometer test units 310, 311 so as to apply this load to the shafts 305, 306 to obtain the desired shaft speeds of the wheel shafts 305, 306 (the true vehicle speed is converted to shaft speed by means of the associated tire model 502, 503).

The true vehicle speed and virtual shaft loads are also provided to the combustion engine representation, in this case the model representations 505, 506 of the drive shafts 307, 308, by means of which (and tire models 507, 508) shafts speeds of virtual shafts 307, 308 can be can be calculated, and also power contribution from the combustion engine.

Since these calculations is performed often and preferably many times a second, the system will quickly adapt to changes in input parameters and also apply a load on the wheel shafts 305, 306 that corresponds to the loads the wheel shafts would be subjected to during real life driving, and hence, e.g. accurate acceleration behavior from e.g. stand still will be obtained, where contribution from the combustion engine is taken into account.

Consequently, a change in any parameter, such as power provided by electric motors or power provided by the virtual combustion engine, or road parameters such as road inclination, will directly be reflected by calculated load and shaft speeds.

Consequently, data obtained from the combustion engine model representation is used to accurately control the dynamometer test units, so that dynamic situations such as accelerations, etc. can accurately be tested since the real contribution from the combustion engine is calculated and used to load the hybrid system by means of the dynamometer test units with a load that corresponds to the load that would occur in a real life situation.

By means of the present invention, various kinds of simulation can be performed. For example, torque/power contribution from the hybrid will influence the combustion engine representation by means of the vehicle speed and loads calculated by the load balancing unit. Shaft speeds of shafts 307, 308 can be calculated from the tire models 507, 508, and by means of the model representation of the combustion engine a corresponding power contribution from the combustion engine can be obtained. By knowledge of fuel consumption of the combustion engine for given power outputs, a current fuel consumption of the vehicle, taking the contribution from the hybrid system into account, can be calculated so as to obtain accurate data regarding fuel reductions resulting from the hybrid system.

This means that e.g. reduction in fuel consumption of the combustion engine, due to the hybrid system portion, can be calculated. The above steps can be repeated for various torque contributions from the electric motors, and also for various vehicle speeds so as to obtain an accurate picture of the behaviour and fuel consumption of the vehicle for various steady-state conditions, as well as for dynamic behaviours, even though not all driven shafts are connected to dynamometer test units.

The invention can advantageously be used to test dynamic behaviours of the vehicle. For example, the vehicle can be accelerated by the electric motors, and during acceleration, the actual torque and rotational speed produced by the electric motors can be measured by the dynamometer test units, and together with data from the combustion engine representation correct loads and speeds of all shafts can be determined according to the above. The combustion engine can be run, by means of the representation, e.g. at any suitable mode such as full power acceleration, half power acceleration etc., and at any suitable gear (the combustion engine representation preferably comprises data for each gear of the vehicle, so as to allow testing of the hybrid system at any gear of the combustion engine system). The behaviour of the combustion engine can be set in the testing, e.g. that the combustion engine is to be simulated as delivering a certain power or increasingly/decreasingly in a certain manner, where the resulting power/speed of the engine still will depend on the vehicle speed and load from the road obtained from the load balancing unit 501.

As mentioned, the result from the data inputted into the load balancing unit is used to control the dynamometer test units 310, 311 so as to apply a brake torque on the wheel shafts of the hybrid system that takes into account the contribution from the combustion engine representation. For example, if the combustion engine representation is run at, e.g., full power, the applied brake torque by the dynamometer test units 310, 311 will be different than if the combustion engine is modelled as running at less than full power.

In principle any kind of driving cycles can be tested using the present invention.

Consequently, the behaviour of the hybrid system in dynamic situations can be tested for various ways of operating the hybrid system, and also for various ways of operating (modelling) the combustion engine (e.g. slow acceleration, fast acceleration, different gears etc).

With regard to the combustion engine representation, this can be known beforehand, e.g. be measured or theoretically determined at a previous occasion. It is, however, also contemplated that the combustion engine representation can be obtained by first performing dynamometer measurements using the dynamometer test units on the front wheel shafts, e.g. in a manner as disclosed in WO2007/13154 A1, to subsequently be used according to the above.

However, if the combustion engine representation is known beforehand, this can allow, at least with regard to testing of hybrid drive portions, use of smaller dynamometer test units. That is, the combustion engine is often capable of providing more power than the electric motors in a vehicle of the kind disclosed in FIG. 3, which means that the dynamometer test units, correspondingly, can be dimensioned for a smaller capability of providing brake torques, thereby allowing dynamometer test units of smaller, and thereby more portable, dimensions.

Devices according to the invention can thus also be made portable for easy transportation to different locations, as well as for use in sites where fixed installations cannot be practically made.

Further, the development of hybrid drives can consume large amounts of time, and it is often not possible, for economical or other reasons, to always have access to vehicle dynamometers for four-wheel testing of the kind discussed above. With regard to testing of such hybrid drives, the present invention allows use of only one or two dynamometer test units. Also, as mentioned, oftentimes (dependent on the relationship combustion engine power—electric motor power) the dynamometer test units can be of considerably smaller dimensions than conventional dynamometer test units (since the most powerful power source of the vehicle need not be tested), with reduced overall cost for the system.

In addition to the above, the present invention also makes it possible to test various combustion engine models for a specific hybrid drive, without having to exchange vehicles and without actually having the combustion engine present in the vehicle, e.g. to determine which one(s) of available combustion engines that benefit the most from use of a hybrid drive.

This far, the invention has been described in connection with dynamometer test units consisting of hydraulic pump assemblies. Although such dynamometer test assemblies work well for testing dynamic behaviours and steady state operation of the hybrid system when the electric motors are used to provide a positive torque, the invention, however, can also advantageously be used together with dynamometer test units comprising electric motor assemblies which are used to generate the desired torque. Use of electric motor assemblies has the advantage that these can not only be used to absorb power delivered from the electric motors of the vehicle, but also to provide a power that simulates positive driving force on the vehicle, i.e. a power that accelerates the drive shafts of the hybrid drive shafts.

This further has the advantage that the present invention can be used also for testing of regenerative braking. The electric motors 303, 304 can be used for braking purposes, e.g., in order to decelerate the vehicle, in which case the electric motors 303, 304 act as alternators instead of as a motor, and regenerates electrical energy for feed-back to e.g. an energy storage such as a battery 314. The regenerated energy can be used to power the electric motor(s) of the vehicle once the need arises again.

The use of electric motor dynamometer test units thus allows that the hybrid system of the vehicle can be tested not only for accelerations, but also for situations involving regenerative braking. This, in turn, allows that the hybrid system can be subjected to complete test drives, with uphill as well as downhill driving and starts and stop. This also allows that very accurate data regarding the hybrid system can be obtained. Hence the system according to the present invention can be utilized to test vehicles where electric motor(s) are only used for regenerative braking power, and where shaft(s) not being connected to a dynamometer test unit provide the propelling power of the vehicle.

With regard to dynamometer test units of the electric motor kind, there exist industrial drives that can be used to very accurately control the speed and load torque of AC electric motors and which can be used for testing of e.g. gears, engines and transmissions. According to the present invention, it has been realized that such industrial drives can be utilized also in dynamometer test units according to the above. Further, such industrial drives involve direct torque control, DTC, which ensures that it is the torque of the electric motor that is the primary control element and not the motor current.

The torque of the electric motor, be it a load torque or propelling torque for use when testing regenerative braking according to the above, can be controlled from zero to full torque within a very short period of time, e.g. milliseconds, which thus makes such drives very suitable for testing according to the above. Such industrial drives can also be arranged to feedback power absorbed from the electric motors 303, 304 to a supply grid when applying a brake torque to the electric motors and thereby acting as alternator. This enhances energy consumption during vehicle testing.

Further, the invention makes it possible to simulate various conditions and driving situations in order to thoroughly test the hybrid system of the vehicle. For example, the hybrid system can be tested for evaluating performance under different conditions such as slippery roads, worn tires, load variations etc.

It is also to test the hybrid system for, e.g. various kinds of tires so as to obtain knowledge of which tires provide the most preferable vehicle performance, e.g. from fuel consumption point of view.

So far, it is the hybrid portion of the vehicle that has been exemplified as being tested. It is also possible, instead, to connect the dynamometer test units to shafts being driven by the combustion engine. In this case a model of the hybrid drive can be used to test the manner in which the hybrid drive would impact the behaviour of the vehicle and also be used to test the combustion engine performance in the presence of a hybrid system. That is, the model of the hybrid system can be known and be simulated when performing dynamometer tests of the combustion engine system of the vehicle. This has the advantage, e.g., that if the hybrid system has been developed and modelled e.g. according to the above, this model can be used when tuning the combustion engine, e.g. in order to improve the efficiency of the combustion engine in view of a hybrid system being present. If more than one hybrid drives are present, it is also possible to make a thorough evaluation of which hybrid drive and/or strategy that is the most preferable to use for a particular combustion engine.

With regard to factors such as normal force, the normal force can be sensed, or alternatively the normal force can be simulated. It is also possible to simulate variations in normal force acting on individual shafts in order to e.g. simulate acceleration, deceleration, vehicle turns, aerodynamic lift, aerodynamic downforce, vehicle load distribution etc.

Further, it is also contemplated that the present invention can be utilized for testing of any vehicle wherein two independent power sources are used, one of which being modeled. This means that one of the power sources must not necessarily constitute a combustion engine, but both (or all, e.g. if each drive shaft of the vehicle is independently driven by a respective electric motor) power sources can consist of electric motors. It is also contemplated that a combustion engine and an electric motor can provide power to a first axle or shaft of an axle, while another independently acting power source provides power to another shaft/axle.

The vehicle can also consist of a vehicle with, e.g. three wheels, where one power (or more) source is connected to a one wheel axle, while one (or more) power sources are connected to the two wheel axle.

It is also contemplated that e.g. only one wheel shaft of e.g. a front or rear axle is being driven and/or used for regenerative braking by a power source.

The present invention is applicable when a first and a second wheel shaft are being independently subjected to a power by independent power sources that can be independently activated, where one of the power sources is represented by e.g. a model or other suitable representation. Consequently, the "simulated" power source need not even be present in the vehicle during testing of the tested power source. The term power source means a power source that is capable of subjecting a wheel shaft to a power (torque), be it a propelling (positive) torque or braking (negative) torque.

The power sources can be independent power sources as disclosed in the above examples. It is, however, also contemplated that the power provided to the one or more virtual shafts can originate from the first power source. For example, a single power source can be used in a four-wheel drive system for providing power to both front and rear axles of a vehicle. In this case, however, the power to wheel shafts not being connected to a dynamometer test unit is not activated, since there will no load absorbing means to absorb power.

Instead, a model of the four-wheel drive system is used to accurately simulate driving with the four-wheel drive system activated, even though only one axle is connected to dynamometer test units. In this case, all power of the combustion engine that is normally distributed to all four wheel shafts is taken out by the shafts being connected to dynamometer test units. This additional power is absorbed by the dynamometer test units, and by means of the load balancing unit the load to be provided by the dynamometer test units is calculated such that the tested shafts still behave as if the power were taken out not only by e.g. the front shafts, of the vehicle, but from all four shafts.

Consequently, accurate accelerations etc. can be obtained even though the powers provided to the tested shafts are such that the wheels would spin if the vehicle was a two-wheel drive vehicle, but this is consequently handled by appropriately loading the shafts.

Since all power is still taken out of the combustion engine, this allows for accurate testing of the combustion engine as if all four wheels were actually driven.

Consequently, by means of the present invention, the vehicle can be tested as a four-wheel drive vehicle by using a model of the four-wheel drive system, which then is used to apply a load to the shaft(s) being connected to dynamometer test units so that a correct behavior representing the actual behavior that the vehicle would exhibit during driving on a road.

This also means that a conventional two-wheel drive vehicle can be simulated as a four-wheel drive vehicle, since the present invention, by means of the dynamometer test units and the model of the four-wheel drive system, makes it possible to simulate presence of a four-wheel drive system. This also means that the behavior of the vehicle, should it be provided with a four-wheel drive system, can be determined.

In this case it can be advantageous to use limitations of torque to be applied by the dynamometer test units, so as to ensure that torque limitations of tested shafts is not exceeded with the risk of damaging components of the vehicle.

In addition to the above, e.g. when testing a four-wheel drive system as described above, apart from the dynamometer test units connected to the only two wheels that are actually being driven by the four wheel drive system and tested, wheel rotation units can be connected to the remaining two wheels that are being modeled in the test.

The wheel rotation units are used to only rotate the modeled shafts, and do not perform any torque measurements. This rotation is completely independent from the testing according to the above, and does not provide any measurement data to the above testing. It can, however, in some situations be necessary to rotate the untested shafts at accurate speed in order to ensure that vehicle internal functions work properly. For example, there can exist vehicle internal functions that give rise to errors if the speed of the non-tested shafts is substantially zero while the tested shafts rotate at high speeds.

The wheel rotation units being connected to the untested shafts can be small since they are only used to cause rotation of untested shafts, and therefore need not be able to provide any high powers. The speed to be used by these additional units can be calculated by the load balancing unit according to the above. Again, the actual loads of these shafts are being modeled according to the above, and the shafts are only rotated in order for other vehicle functions to function properly.

Even further, the present invention is also applicable in situations where two independent power sources act on the same shaft, but where one of the power sources is modeled according to the above. For example, as mentioned above, a combustion engine and an electric motor can be arranged to simultaneously and/or sequentially provide power to the same wheel shafts, e.g. in parallel hybrid vehicles. In this case, one of the power sources is modelled according to the above, and the dynamometer test unit(s) are controlled such that the active power source exhibit a load as if the vehicle were driven on a road with both power sources active. I.e., the performance of the vehicle can be tested as if the hybrid system is present and acting on the same shaft as the combustion engine, even though the hybrid system is not present, or vice versa.

According to the above power (torque) can be applied to a wheel shaft by the said dynamometer test unit and the said power source. The power (torque) being applied to the said wheel shaft can be a brake torque or a propelling torque depending on the kind of power source and dynamometer test unit being used. If the power source is an electric motor, the power source can be arranged to provide a brake torque and/or a propelling torque, and if the dynamometer test unit applies power by means of an electric motor according to the above, this power also can be a braking power and/or a propelling power.

In the above description particular kinds of dynamometer test units have been described, but the present invention is applicable also for other kinds of dynamometer test units. For example, the dynamometer test units can be of a kind where a disc brake and/or eddy currents are used to absorb power.

What is claimed is:

1. Method for dynamometer testing of a vehicle, the vehicle comprising at least a first wheel shaft and a second wheel shaft, said vehicle comprising a first power source for providing power to said first wheel shaft, the method comprising, with only said first wheel shaft being connected to a dynamometer test unit,
by means of said first power source, applying a first power to said first wheel shaft being connected to the said dynamometer test unit,
determining a representation of said first power by means of said dynamometer test unit,
determining a second power, different from said first power, applied to at least one of said first wheel shaft and second wheel shaft, the second power being a virtual power generated by means of a second power source and being represented by a virtual representation of said second power, and
by means of the representation of said first power determined by said dynamometer test unit and said virtual representation of said second power, determining a first speed being a representation of the speed of said vehicle when being driven on a road subjected to said first and second power.

2. Method according to claim 1, wherein at least one of said first and second powers is selectively applied.

3. Method according to claim 1, wherein said second power is generated by means of a second power source being different from said first power source, said second power source being represented by a virtual representation.

4. Method according to claim 3, wherein said second power source provide power to said first and/or said second wheel shaft.

5. Method according to claim 1, said method further comprising:
by means of the representation of said first power determined by said dynamometer test unit and said second virtual power, determining a load that substantially correspond to the load that said first wheel shaft would be subjected to when said vehicle is being driven on a road subjected to said first and second power.

6. Method according to claim 1, wherein said method further comprises:
by means of said dynamometer test unit, applying a load to said first wheel shaft, said load substantially corresponding to the load said first wheel shaft would be subjected to when said vehicle is being driven on a road subjected to said first and second power.

7. Method according to claim 1, wherein said first wheel shaft is connected to said first power source for providing said first power to said first wheel shaft, and wherein said second wheel shaft is arranged to be subjected to said second power, the said second power being a virtual power being represented by a representation of a power source of said vehicle providing power to the said second wheel shaft.

8. Method according to claim 1, the method further comprising:
   determining at least one parameter representing a characteristic of the vehicle when being driven on a road by means of the said first and second power source.

9. Method according to claim 1, wherein said first speed is obtained by means of a model representing the tire-road interface of wheel shafts being subjected to at least one of a real and a virtual power.

10. Method according to claim 1, wherein said first speed is obtained by determining slip-values for all wheel shafts being subjected to at least one of a real and a virtual power.

11. Method according to claim 10, wherein said slip-value(s) is retrieved from one or more tire model(s).

12. Method according to claim 1, wherein said virtual representation of a power source providing power to a wheel shaft is a representation of power exhibited by the said wheel shaft from said virtual power source.

13. Method according to claim 1, wherein said second power is a virtual power being represented by a virtual representation of power generating means of said vehicle for generating said second power.

14. Method according to claim 1, wherein, during said dynamometer testing of the said vehicle, substantially no power is provided to said second wheel shaft.

15. Method according to claim 1, wherein power provided by said second power source is provided independent from power provided by the said first power source.

16. Method according to claim 1, wherein said first wheel shaft is a first front wheel shaft or a first rear wheel shaft, and wherein said second wheel shaft, correspondingly, is a first rear wheel shaft or a first front wheel shaft, respectively.

17. Method according to claim 1, wherein each of said first and second powers is a brake power or a propelling power.

18. Method according to claim 1, wherein said representation of said second power source is a model of the said second power source.

19. Method according to claim 18, wherein said model of the said second power source has been established using a vehicle dynamometer.

20. Method according to claim 1, wherein, when determining said representation of the speed of said vehicle when being driven on a road, a normal force acting on said shafts is detected and/or simulated.

21. Method according to claim 1, wherein each of said power sources is a combustion engine or an electric motor.

22. Method according to claim 1, wherein at least one of said first and said second power source is an electric motor.

23. Method according to claim 1, wherein said dynamometer test unit is rigidly coupled to said first wheel shaft.

24. Method according to claim 23, wherein said dynamometer test unit is connected to the said vehicle by connecting the dynamometer test unit to a wheel hub of the said wheel shaft by means of a direct-coupling.

25. Method according to claim 1, wherein said powers is represented by torques.

26. Method according to claim 1, wherein said determinations of first power and second power and said first speed is repeatedly performed to repeatedly control a load applied by said first dynamometer test unit based on the said determinations, so as to allow testing of dynamic behaviours of the vehicle.

27. Method according to claim 1, wherein, when a real power is applied to more than one wheel shaft during testing, dynamometer test units are connected to all wheel shafts being powered by a real power.

28. Method according to claim 1, wherein one or more dynamometer test units are arranged to be standing freely on a surface and connected to the vehicle by means of a rigid coupling to the wheel shafts, while supporting the weight of the vehicle by means of the said rigid coupling.

29. System for dynamometer testing of a vehicle comprising at least a first wheel shaft and a second wheel shaft, said vehicle further comprising a first power source for providing power to said first wheel shaft, the system comprising means for, with only said first wheel shaft being connected to a dynamometer test unit,
   applying a first power to said first wheel shaft being connected to the said dynamometer test unit by means of said first power source,
   determining a representation of said first power by means of said dynamometer test unit,
   determining a second power, being different from said first power, being applied to at least one of said first wheel shaft and said second wheel shaft, the said second power being a virtual power being represented by a virtual representation of said second power, and
   by means of the representation of said first power determined by said dynamometer test unit and said virtual representation of said second power, determining a first speed being a representation of the speed of said vehicle when being driven on a road subjected to said first and second power.

30. Vehicle dynamometer for dynamometer testing of a vehicle comprising at least a first wheel shaft and a second wheel shaft, said vehicle further comprising a first power source for providing power to said first wheel shaft, the vehicle dynamometer comprising means for, with only said first wheel shaft being connected to a dynamometer test unit:
   applying a first power to said first wheel shaft being connected to said dynamometer test unit by means of said first power source,
   determining a representation of said first power by means of said dynamometer test unit,
   determining a second power, being different from said first power, being applied to at least one of said first wheel shaft and said second wheel shaft, said second power being a virtual power represented by a virtual representation of said second power, and
   by means of the representation of said first power determined by said dynamometer test unit and said virtual representation of said second power, determining a first speed being a representation of the speed of said vehicle when being driven on a road subjected to said first and second power.

31. Method for dynamometer testing of a vehicle, the vehicle comprising at least a first wheel shaft and a second wheel shaft, said vehicle comprising a first power source for providing power to said first wheel shaft, the method comprising, with only said first wheel shaft being connected to a dynamometer test unit,
   by means of said first power source, applying a first power to said first wheel shaft being connected to the said dynamometer test unit, determining a representation of said first power by means of said dynamometer test unit, determining a second power, being different from said first power, applied to at least one of said first wheel shaft and second wheel shaft, the said second power being a virtual power being represented by a virtual representation of said second power, and by means of the representation of said first power determined by said dynamometer test unit and said virtual representation of said second power, determining a first speed being a representation of the speed of said vehicle when being driven on a road subjected to said first and second power, wherein said first wheel shaft is connected to said first power source for providing said first power to said first wheel shaft, and wherein said second wheel shaft is arranged to be subjected to said second power, the said second power being a virtual power being represented by a representation of a power source of said vehicle providing power to the said second wheel shaft, wherein said power source is a virtual representation of said first power source, and wherein, when dynamometer testing said vehicle, said first power source applies a power to said first wheel shaft that substantially corresponds to the total power being applied to said first and said second wheel shaft when driving on a road, and wherein the load applied to the first wheel shaft by the dynamometer test unit is such that the rotational speed of said first wheel shaft correspond to the speed of said vehicle when being driven on a road subjected to said first and second power.

\* \* \* \* \*